(12) United States Patent
Krishnamoorthy et al.

(10) Patent No.: US 9,356,884 B2
(45) Date of Patent: May 31, 2016

(54) MSDC SCALING THROUGH ON-DEMAND PATH UPDATE

(71) Applicant: Cisco Technology, Inc., San Jose, CA (US)

(72) Inventors: Pags Krishnamoorthy, San Jose, CA (US); Rajagopalan Janakiraman, Cupertino, CA (US); Chia Alex Tsai, Cupertino, CA (US); Vinay Parameswarannair, Milpitas, CA (US)

(73) Assignee: CISCO TECHNOLOGY, INC., San Jose ( * ) Notice: Subject to any disclaimer, the term of this patent is extended or adjusted under 35 U.S.C. 154(b) by 290 days.

(21) Appl. No.: 13/744,137

(22) Filed: Jan. 17, 2013

(65) Prior Publication Data

US 2014/0198800 A1 Jul. 17, 2014

(51) Int. Cl.
*H04L 29/06* (2006.01)
*H04L 12/66* (2006.01)
*H04L 12/933* (2013.01)

(52) U.S. Cl.
CPC ...................................... *H04L 49/15* (2013.01)

(58) Field of Classification Search
CPC ..... H04L 45/00; H04L 12/2697; H04L 45/66; H04L 12/56; H04L 45/08
USPC ........................................ 370/238–244, 401
See application file for complete search history.

(56) References Cited

U.S. PATENT DOCUMENTS

| 6,804,201 | B1 | 10/2004 | Gelenbe |
| 2008/0089247 | A1 | 4/2008 | Sane et al. |
| 2010/0232435 | A1 | 9/2010 | Jabr et al. |
| 2011/0134925 | A1 * | 6/2011 | Safrai ..................... H04L 49/35 370/395.53 |
| 2011/0194403 | A1 | 8/2011 | Sajassi et al. |
| 2011/0261828 | A1 | 10/2011 | Smith |

(Continued)

FOREIGN PATENT DOCUMENTS

| WO | 2012023292 A1 | 2/2012 |
| WO | WO2012023292 A1 * | 2/2012 |
| WO | WO 2012023292 A1 * | 2/2012 |
| WO | 2012113251 A1 | 8/2012 |

OTHER PUBLICATIONS

International Search Report and Written Opinion for International Application No. PCT/US2014/011814 mailed Apr. 7, 2014.

(Continued)

*Primary Examiner* — Brandon Renner
*Assistant Examiner* — Voster Preval
(74) *Attorney, Agent, or Firm* — Polsinelli PC

(57) ABSTRACT

In one embodiment, a copy of an original packet of a traffic flow is created at an ingress leaf node of a cloud switch. The ingress leaf node forwards the original packet along a less-specific path through the cloud switch, the less-specific path based on a domain index of an egress domain for the original packet. The copy of the original packet is modified to create a more specific path learn request packet. The ingress leaf node forwards the more specific path learn request packet along the less-specific path through the cloud switch. The ingress leaf node received back a more specific path learn request reply packet that includes an indication of a fabric system port. The ingress leaf node then programs a forwarding table based on the indication of the fabric system port, to have subsequent packets of the traffic flow forwarded along a more-specific path.

20 Claims, 5 Drawing Sheets

(56) References Cited

U.S. PATENT DOCUMENTS

| | | | |
|---|---|---|---|
| 2011/0268120 A1* | 11/2011 | Vobbilisetty | H04L 45/46 370/392 |
| 2011/0299406 A1* | 12/2011 | Vobbilisetty | H04L 43/10 370/248 |
| 2012/0327766 A1 | 12/2012 | Tsai et al. | |
| 2013/0148662 A1* | 6/2013 | Kamble et al. | 370/392 |
| 2013/0188647 A1* | 7/2013 | Herrell et al. | 370/392 |
| 2014/0140244 A1* | 5/2014 | Kapadia | H04L 61/103 370/255 |

OTHER PUBLICATIONS

U.S. Appl. No. 13/421,572, filed Mar. 15, 2012 by Alex Tsai et al. for Interconnecting Segmented Layer Two Network for Cloud Switching, pp. 1-31.

U.S. Appl. No. 13/593,190, filed Aug. 23, 2012 by Chia Alex Tsai et al. for Trill Optimal Forwarding and Traffic Engineered Multipathing in Cloud Switching, pp. 1-45.

U.S. Appl. No. 13/601,042, filed Aug. 31, 2012 by Norman W. Finn et al. for MST Extensions for Flexible and Scalable VN-Segment Loop Prevention, pp. 1-28.

* cited by examiner

MSDC SCALING THROUGH ON-DEMAND PATH UPDATE

TECHNICAL FIELD

The present disclosure relates generally to computer networking, and, more particularly, to on-demand path updates in a massively scaled data center (MSDC) architecture.

BACKGROUND

In MSDC architectures, leaf switches (also referred to as "top-of-rack" switches (ToRs)) have typically maintained a globally-unique index corresponding to every egress end port. The index was static, being the same for the life of the architecture. When a new flow was established, an ingress leaf switch (ToR) would use the unique index of the egress end port to fetch, among other things, the particular fabric system port used to switch traffic to the egress leaf switch (ToR). However, such a technique scales poorly. Accordingly, it may be impractical to call on an ingress leaf switch (ToR) to maintain globally-unique index information for all end ports so that it may be later used to fetch, among other things, the particular fabric system port needed to reach the egress leaf switch (ToR). There is a need for improved techniques.

BRIEF DESCRIPTION OF THE DRAWINGS

The embodiments described herein may be better understood by referring to the accompanying drawings in which like reference numerals indicate identically or functionally similar elements, of which.

DESCRIPTION OF EXAMPLE EMBODIMENTS

Overview

According to an embodiment of the present disclosure, a copy of an original packet of a traffic flow is created at an ingress leaf node of a cloud switch. The ingress leaf node forwards the original packet along a less-specific path through the cloud switch, the less-specific path based on a domain index of an egress domain for the original packet. The copy of the original packet is modified to create a more specific path learn request packet. The ingress leaf node forwards the more specific path learn request packet along the less-specific path through the cloud switch. The ingress leaf node receives back a more specific path learn request reply packet that includes an indication of a fabric system port. The ingress leaf node may then program a forwarding table based on the indication of the fabric system port, to have subsequent packets of the traffic flow forwarded along a more-specific path defined by the fabric system port.

Example Embodiments

Layer-2 and layer-3 network protocols are used by networks to transports data messages at the Data Link Layer, and the Network Layer, respectively, of the Open Systems Interconnection (OSI) Reference Model. Layer-2 network protocols typically provide the ability to establish shared media links, where nodes at least appear to share a common physical media, for example, an Ethernet local area network (LAN). Layer-2 protocols generally rely on hardware-based address, such as media access control (MAC) addresses. Layer-3 network protocols typically provide the ability to forward packets through intermediate devices, across larger networks. Layer-3 protocols generally rely on host addresses, such as Internet Protocol (IP) addresses, that are assigned in software.

Layer-2 and Layer-3 network protocols may be deployed in a variety of settings. One setting is that of a data center. Data centers may support tens of thousands, or even hundreds of thousands, of hosts, e.g., individual servers. This scale may test the capabilities of many architectures. To address the needs of data centers, a variety of new massively scaled data center (MSDC) architectures are being deployed. Many of these architectures take the form of cloud switching architectures. Cloud switching architectures (or simply "cloud switches") typically include a large number of individual "top-of-rack" switches (ToRs) that are coupled to a number of hosts. Such ToRs may be considered "leafs" of the cloud switch, and may be referred to as leaf switches. The leaf switches (ToRs) may be interconnected by a high-speed fabric and administered collectively as virtual switches.

Figure 1:
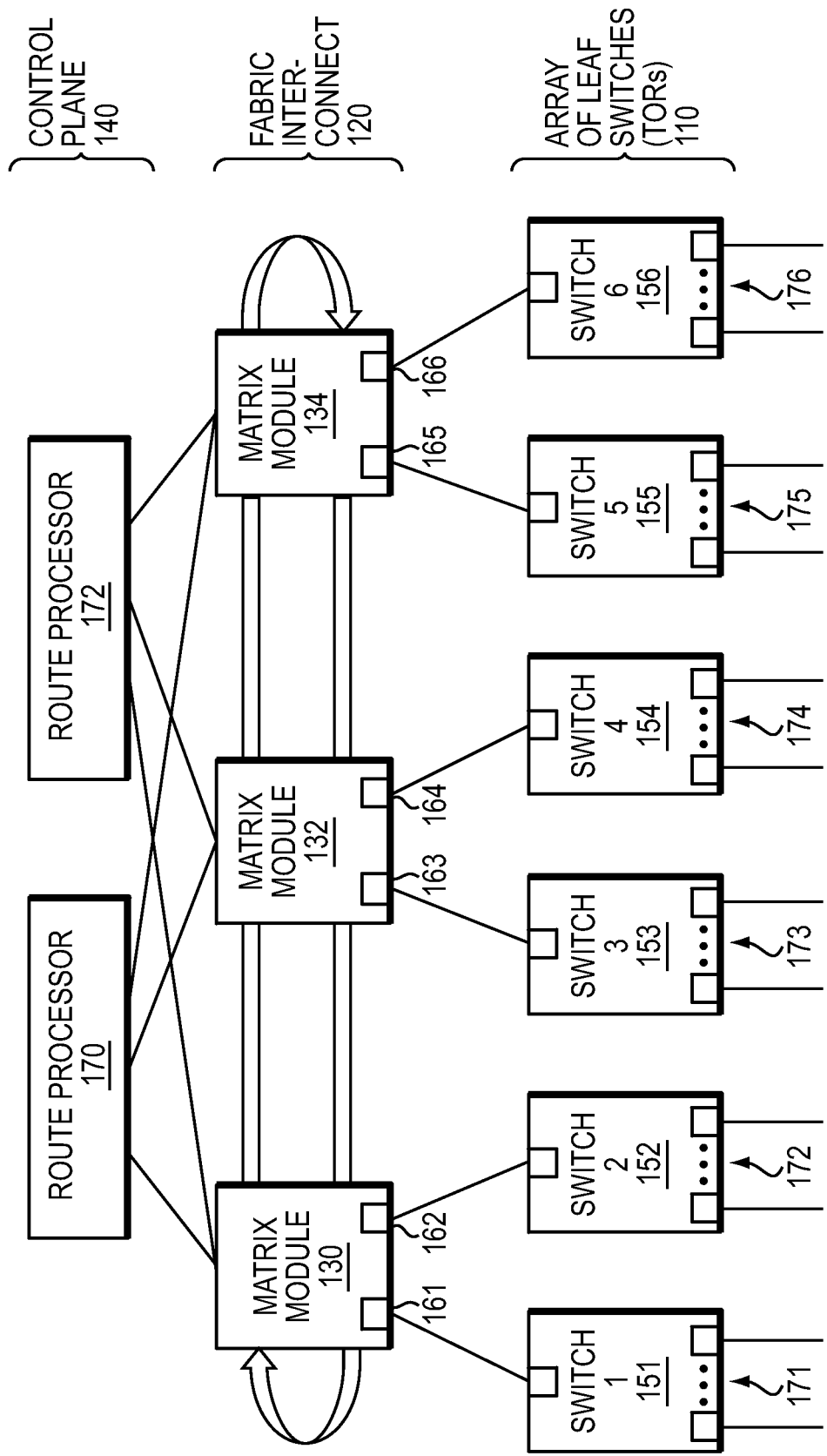
FIG. 1 is a block diagram of an example cloud switch.

FIG. 1 is a block diagram of an example cloud switch 100. The cloud switch 100 provides an array of leaf switches (ToRs) 110 composed of individual leaf switches (ToRs) switches 151-156. The leaf switches (ToRs) 151-156 may provide a large number of end ports 171-176 to which hosts (e.g., severs, external switches or bridges, etc.) may be coupled. The leaf switches (ToRs) 151-156 may be coupled via links to fabric system ports 161-166 of a fabric interconnect 120. While in FIG. 1, each leaf switch 151-156 is shown coupled via a single link, it should be understood that typically a number of links will be utilized to provide greater throughput and redundancy. The fabric interconnect 120 may include a plurality of matrix modules 130-134 that provide pathways among the leaf switches. The matrix modules 130-134 operate under the direction of a control plane 140, which may include a plurality of route processors 170, 172 that control forwarding among the leaf switches 151-156.

Figure 2:
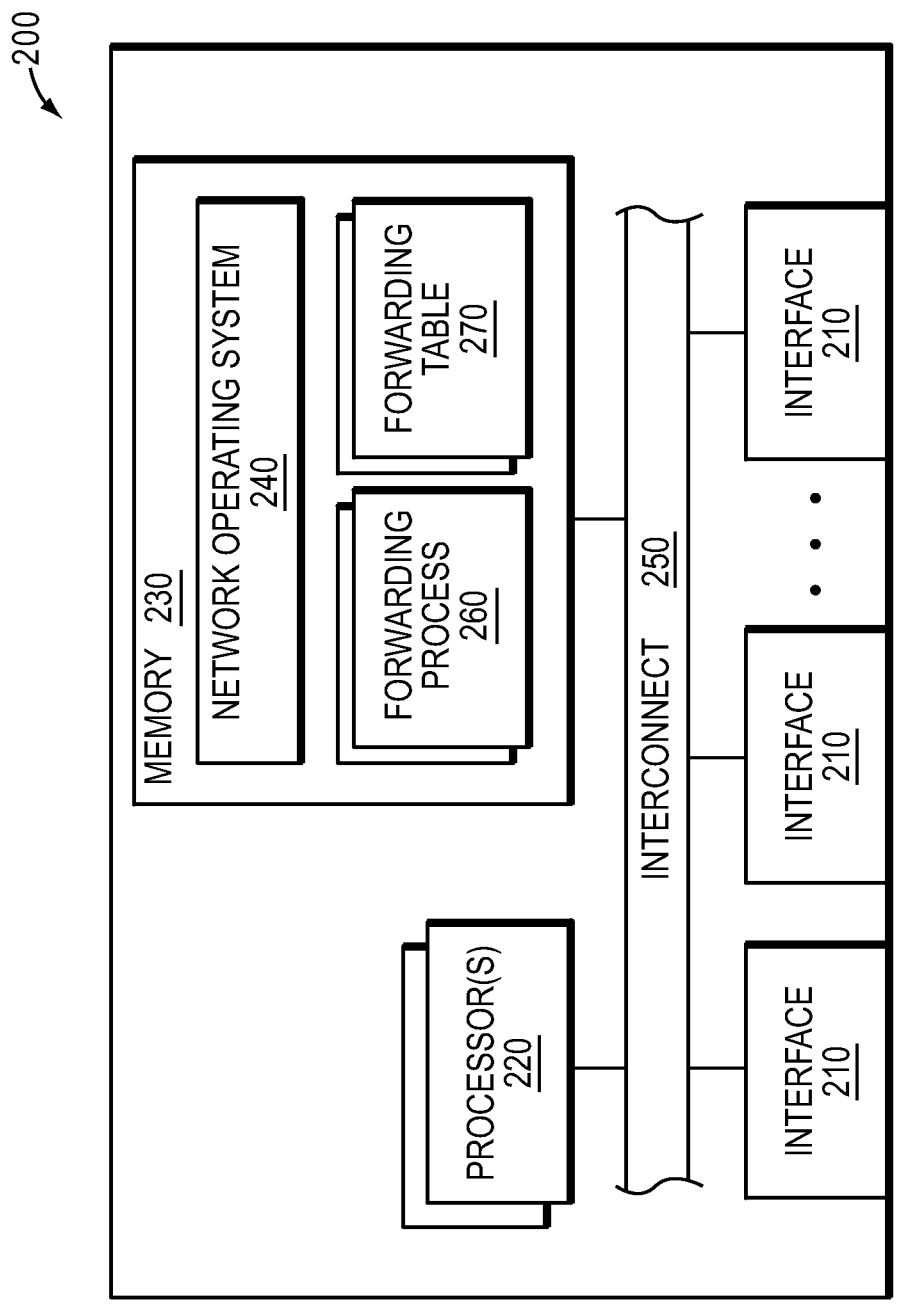
FIG. 2 is a hardware block diagram of an example leaf switch (ToR)

FIG. 2 is a hardware block diagram of an example leaf switch (ToR) 200. The switch 200 includes a plurality of interfaces 210 that serve as end ports to couple to hosts, and as fabric-facing ports to couple to the fabric interconnect 120. The switch 200 includes also includes one or more processors 220, and a memory 230, coupled by an interconnect structure 250. The memory 230 includes a plurality of storage locations for storing software and data structures. The one or more processors 220 include logic configured to execute the software and manipulate data from the data structures. The software may include a network operating system 240, as well as a number of protocol processes, including forwarding processes 260, for example, layer-2 and layer-3 forwarding processes. The data structures may include various forwarding tables 270, the operation of some of which are also discussed below.

In MSDC architectures, such as cloud switches, it is often desirable to provide port level Quality of Service (QoS). Port level QoS may include a number of resource reservation control mechanisms between an ingress end port on an ingress leaf switch (ToR) and an egress end port on an egress leaf switch (ToR), which guarantee a certain level of performance for a data flow there between. In order to provide port level QoS, it is typically necessary to precisely know the path through the cloud switch, including the particular fabric system port that serves the egress end port of the egress leaf switch (ToR). Ingress leaf switches (ToRs) may determine the particular fabric system port by looking to globally-unique indexes corresponding to every egress end port. Specifically, ingress leaf switches (ToRs) may maintain a globally-unique index corresponding to every egress end port. This index is static, being the same for the life of the architecture/cloud switch. When a new flow is established, the ingress leaf switch (ToR) may use the unique index of the egress end port to fetch, among other things, the particular fabric system port used to switch traffic to the egress end port of the egress leaf switch (ToR).

However, such a technique scales poorly. While a typical fabric interconnect may be capable of maintaining globally-unique indexes for all the end ports that may be present in a MSDC architecture/cloud switch, leaf switches (ToRs) may be burdened by this task. Their forwarding tables may have limited sizes that are insufficient to accommodate all the potential indexes. Accordingly, it may be impractical to call on ingress leaf switches (ToRs) to maintain globally-unique index information for all end ports.

Generally, traffic from a given ingress leaf switch (ToR) is destined for only a small group of egress end ports of egress leaf switches (ToR) at any given moment in time. While this group of egress end ports may change over time, it typically does not increase beyond a moderate size. Leveraging this property, a multi-layer addressing technique may be implemented that uses indexes for end ports that are unique to the leaf switch (ToR), but not globally unique. That is, the index of an end port of one leaf switch (ToR) may be reused by another leaf switch (ToR) to point to a different end port. A higher level of indexing, specifically, a domain index, may be utilized to define portions (i.e. domains) of the cloud switch in which the index of an end port is unique In one embodiment of the present disclosure, ports of one or more leaf switches (ToRs) are organized as a domain and associated with a domain index. Where ports of each leaf switch (ToR) are organized into a separate domain, the domain index may be the same as an index of the leaf switch (ToR). Where ports of several leaf switches (ToR) are organized into the same domain, the domain index may have an independent value. Within a domain, a unique more-specific port index, which is unique for every port in the domain, is associated with each end port.

For a new flow, the domain index may be used by the ingress leaf switch (ToR) to direct traffic to the egress domain. That is, an aggregated entry of a forwarding table in the ingress leaf switch may indicate the domain index of the egress domain. Once at the egress domain, a leaf switch (ToR) may look up in one of its forwarding tables a more-specific index of the egress end port to direct the traffic to the appropriate end port.

The use of a domain index may conserve index space, as well as result in improved summarization of routes learned from domains. However, in some cases, it may result in less than optimal traffic forwarding (i.e. multiple hops through the fabric interconnect 120). Since the domain index identifies the egress domain rather than the specific egress leaf switch (ToR) in that domain, traffic may simply be passed to any leaf switch (ToR) in the egress domain. If the leaf switch (ToR) that receives the traffic happens to not be the leaf switch (ToR) that includes the egress end port, the switch (ToR) may have to forward the traffic (i.e. with a second hop) back through the fabric interconnect 120 to the appropriate leaf switch (ToR).

In addition, the use of a domain index may hinder QoS in the switch fabric for the end port. Since the domain index identifies the egress domain rather than a specific leaf switch (ToR), it does not pinpoint a particular fabric system port that leads to the egress end port. This may prevent port level QoS techniques, which require knowledge of a particular fabric system port being used.

To address these issues, in one embodiment of the present disclosure, the ingress leaf switch (ToR) may transition from initially using the less-specific path that is defined by the domain index (that will pass traffic to any leaf switch (ToR) of the egress domain), to a more-specific path (that is defined by the particular fabric system port coupled to the leaf switch (ToR) serving the egress end port). The move from using the less-specific path to the more-specific path may be initiated in response to a trigger. The trigger may be receipt of a packet for which a destination lookup points to a domain index, that is associated with a new source being learnt, which has an egress lookup pointing back to the fabric interconnect, or that satisfies other conditions.

In order to transition from using the less-specific path defined by the domain index to the more-specific path defined by the fabric system port, above discussed aggregated entry in the forwarding table in the ingress leaf switch may be replaces with one or more individual entries that indicate a local index, which is used for a more-specific path. The individual entries may be created through a special procedure, and aged out when the traffic flow ceases to exist.

In one implementation, a copy (e.g., a rate limited copy) of an original packet of the traffic flow may be made, such that there is both an original packet and a copy of that packet. The original packet may be simply forwarded along the less-specific path, based on the domain index of the egress domain. The copy of the packet may be modified by adding header fields (e.g. transport header fields) to create a More Specific Path Learn request packet that is sent to the egress domain to fetch the fabric system port serving the egress end port. A More Specific Path Learn reply packet including from the egress domain that includes the fabric system port may eventually be received back at the ingress leaf switch (ToR). Thereafter, the ingress leaf switch may send a message to the fabric interconnect 120 to program a local index in the fabric interconnect, and may program a local forwarding table entry with the local index, to direct packets along the more-specific path defined by the fabric system port.

In addition to forwarding of traffic flows (e.g., with Layer 2 or Layer 3 forwarding), the technique may be utilized to signal host moves among leaf switches (ToRs). In such case a unsolicited More Specific Path Learn packet may be utilized. Further, the technique may be used in conduction with a Transparent Interconnect of Lots of Links (TRILL) based fabric interconnect. One of skill in the art will understand the technique is readily applicable to a variety of situations, and the specific examples provided herein are merely representative of its many applications.

Figure 3:
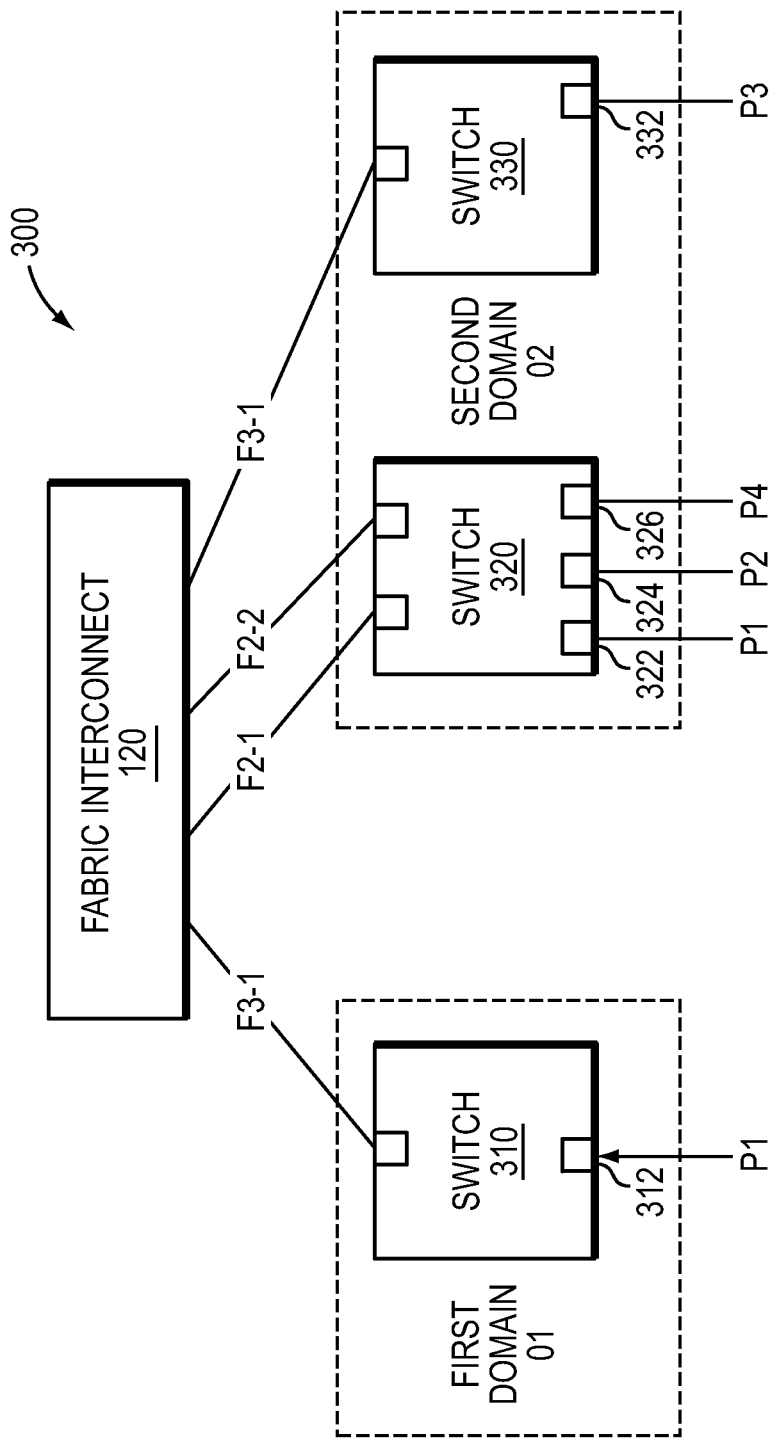
FIG. 3 is a block diagram illustrating transition from using a less-specific path to a more-specific path in connection with an example traffic flow in an example cloud switch.

FIG. 3 is a block diagram illustrating transition from using a less-specific path to a more-specific path in connection with an example traffic flow in an example cloud switch 300. The cloud switch 300 may be structured similar to FIG. 1, however for purposes of illustration, certain portions have been abstracted. A leaf switch (ToR) 310 may be associated with a first domain and additional leaf switches (ToRs) 320, 330 may be associated with a second domain. The second domain may have a domain index D2. End ports 312, 322, 324, 332 may couple the leaf switches (ToRs) to hosts. The end ports 312, 322, 324, 326, 332 of each domain may be associated with more-specific indexes P1, P2, P3, P4, which are unique within the respective domain, but not globally unique. For example, the index P1 may be used within the first domain to represent port 312 of the leaf switch 310, while in the second domain it may represent port 322 of leaf switch (ToR) 320. Fabric system ports F3-1, F2-1, F2-2, F3-1 may couple the leaf switches (ToRs) to a fabric interconnect 120.

An example packet of a traffic flow may be received at an end port 312 of the leaf switch (ToR) 310, which serves as the ingress leaf switch (ToR). The packet of the traffic flow may be destined for an egress end port 332 of the leaf switch (ToR) 330, which serves as the egress leaf switch (ToR). The ingress leaf switch (ToR) may perform several operations.

The ingress leaf switch (ToR) may cause the original packet of the traffic flow to be forwarded using the domain index D2 of the second domain, which serves as the egress domain. Such forwarding may cause the original packet to end up at either leaf switch (ToR) 320 or leaf switch (ToR) 330. The receiving leaf switch (ToR) may perform an additional lookup to determine the more-specific index P3 of the egress end port 332. The packet may be forwarded to the appropriate leaf switch (ToR) 330 (if need be). Eventually, the original packet of the traffic flow is forwarded out the egress end port 332 to a host.

In addition, the ingress leaf switch (ToR) may make a copy (e.g., a rate limited copy) of the original packet of the original packet of the traffic flow. The ingress leaf switch (ToR) may add header fields (e.g., transport header fields) to the copy, to turn the copy into a More Specific Path Learn request packet. The More Specific Path Learn request packet, among other things, may have a type set to MORE_SPECIFIC_PATH_LEARN and a subtype set to REQUEST, as explained further below. The More Specific Path Learn request packet may be forwarded in a manner similar to the original packet, and end up at a leaf switch (ToR) 320 or 330 of the egress domain. The receiving leaf switch (ToR) may perform a lookup based on the domain index D2, and examine the packet type to determine the packet is a More Specific Path Learn request packet. Based on the More Specific Path Learn request packet, the receiving leaf switch (ToR) may modify fields of the packet to produce a More Specific Path Learn reply packet that, among other things, has a type set to MORE_SPECIFIC_PATH_LEARN and a subtype now set to REPLY. The receiving leaf switch (ToR) may add an indication of the fabric system port F3,1 to the More Specific Path Learn Request reply packet and return the packet to the ingress leaf switch (ToR).

Upon receiving the More Specific Path Learn reply packet, the ingress leaf switch (ToR) uses one of the unused local indices (e.g., L1) form a pool of indexes. It sends a message to the fabric interconnect 120 to program the local index L1 in the fabric interconnect 120 to use the fabric system port F3,1 indicated in the More Specific Path Learn Request reply packet. It also programs an individual local forwarding table entry with local index L1. Once this occurs, packets of the traffic flow may be forwarded by the ingress leaf switch over the more-specific path defined by the fabric system port F3,1, so they are forwarded directly to leaf switch (ToR) 330 and provided to the egress end port 332, without potential second-hops through the fabric interconnect 120. By allocating the local index L1 upon demand, and allowing it to be reusable across different leaf switches of different domains at the same time, the system may readily scale, efficiently using indices to cover a wide range of ports. Eventually, when the traffic flow ceases to exist, entries corresponding to the local index L1 may age out, and the local index L1 may be returned to the pool of indexes, conserving index usage.

Figure 4:
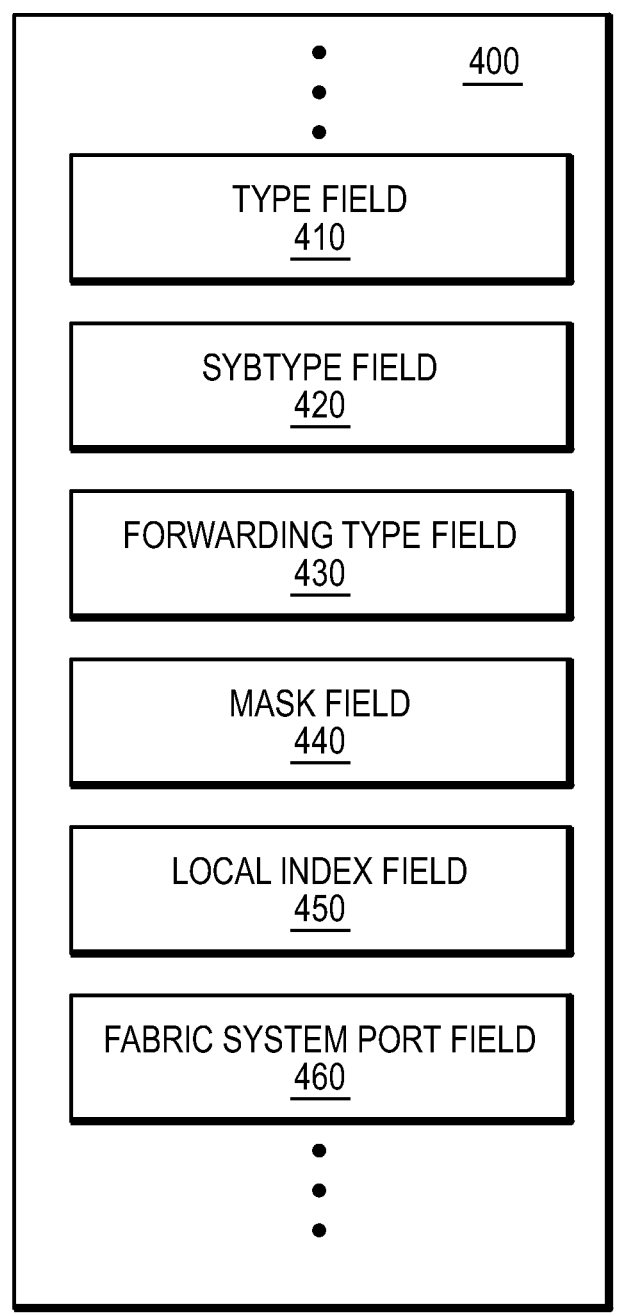
FIG. 4 is a diagram of an example More Specific Path Learn packet.

FIG. 4 is a diagram of an example More Specific Path Learn packet. The More Specific Path Learn packet may include a number of typical headers and fields (not shown). In addition, the More Specific Path Learn packet may include extension fields used with the embodiments described herein. Specifically, a type field 410 may indicate a type of MORE_SPECIFIC_PATH_LEARN. This may be a special type, dedicated for use with the techniques described herein. A subtype field 420 may indicate a subtype of REQUEST, REPLY or UNSOLICITED. The REQUEST subtype may be used by an ingress leaf switch (ToR) to indicate the packet is a More Specific Path Learn request packet, and that the ingress leaf switch (ToR) only knows an egress domain index, and desires to learn the system port that serves the egress end port. The REPLY subtype may be used by a leaf switch (ToR) of the egress domain, when it receives a More Specific Path Learn request packet, performs a forwarding table lookup, and determines the egress port. The REPLY subtype may indicate the leaf switch (ToR) of the egress domain is providing an indication of the fabric system port serving the egress end port. Further, an UNSOLICITED subtype may be used in a variety of other circumstances, for instance, when an egress leaf switch (ToR) detects an ingress leaf switch (ToR) has stale information and a host has moved, or when new layer-2 address is learned or layer-3 to layer-2 address binding is created at a leaf switch (ToR) for tracking host moves.

A forwarding type field 430 may indicate a field of packets of the traffic that is associated with a binding of a more-specific index to a fabric system port. For a packet having a REQUEST subtype or a REPLY subtype, the forwarding type field 430 may indicate a layer-2 or layer-3 source address. For a packet having an UNSOLICITED subtype, the forwarding type field may indicate a layer-2 or layer-3 source address or a layer-2 or layer-3 destination address.

A mask field 440 may include a mask of a prefix for the address associated with the forwarding type. For a packet having a REQUEST subtype, this field may be left empty, and filled in at the leaf switch (ToR) of the egress domain when the packet is returned as a REPLY subtype packet. For a packet having an UNSOLICITED subtype, this field may be set by the leaf switch (ToR) originating the packet. The field may be of used in summarization of prefixes learned from the ingress domain and for installation of more-specific prefixes, if instructed.

A local index field 450 may store a more-specific index, which is used to, among other things, match REQUEST subtype packets and REPLY subtype packets. For a packet having a REQUEST subtype, this field may be filled with an index fetched from a pool of indexes at the ingress leaf switch (ToR), which are locally significant to the ingress leaf switch (ToR), but that may be reused by other leaf switches (ToRs). For a packet having a REPLY subtype, it may be filled by a leaf switch (ToR) of the egress domain by fetching it from the corresponding packet having a REPLY subtype. The field may be used by the ingress leaf switch (ToR) to match the REPLY subtype packet to the corresponding REQUEST subtype packet it sent. For a packet having an UNSOLICITED subtype, this field may not be used.

Still further, a fabric system port field 460 may store an indication of the fabric system port that serves the egress end port of a leaf switch (ToR) in the egress domain. Along with forwarding packets, the fabric system port may be used in applying QoS to packets of a traffic flow. For a packet having a REQUEST subtype, the field may be left empty by the ingress leaf switch (ToR). For a packet having a REPLY subtype, the field may be filed in by a leaf switch (ToR) of the egress domain. The switch may perform a forwarding table lookup to determine the more-specific index associates with the destination of the traffic. From this index, the switch may perform another table lookup to determine the fabric system port that serves the destination. The result of this lookup is sent back in fabric system port field 450 of the packet having the REPLY subtype. For a packet having an UNSOLICITED subtype, the leaf switch (ToR) originating the packet may set fabric system port field 460 with an indication of the fabric system port for the prefix indicated in the forwarding type.

Figure 5:
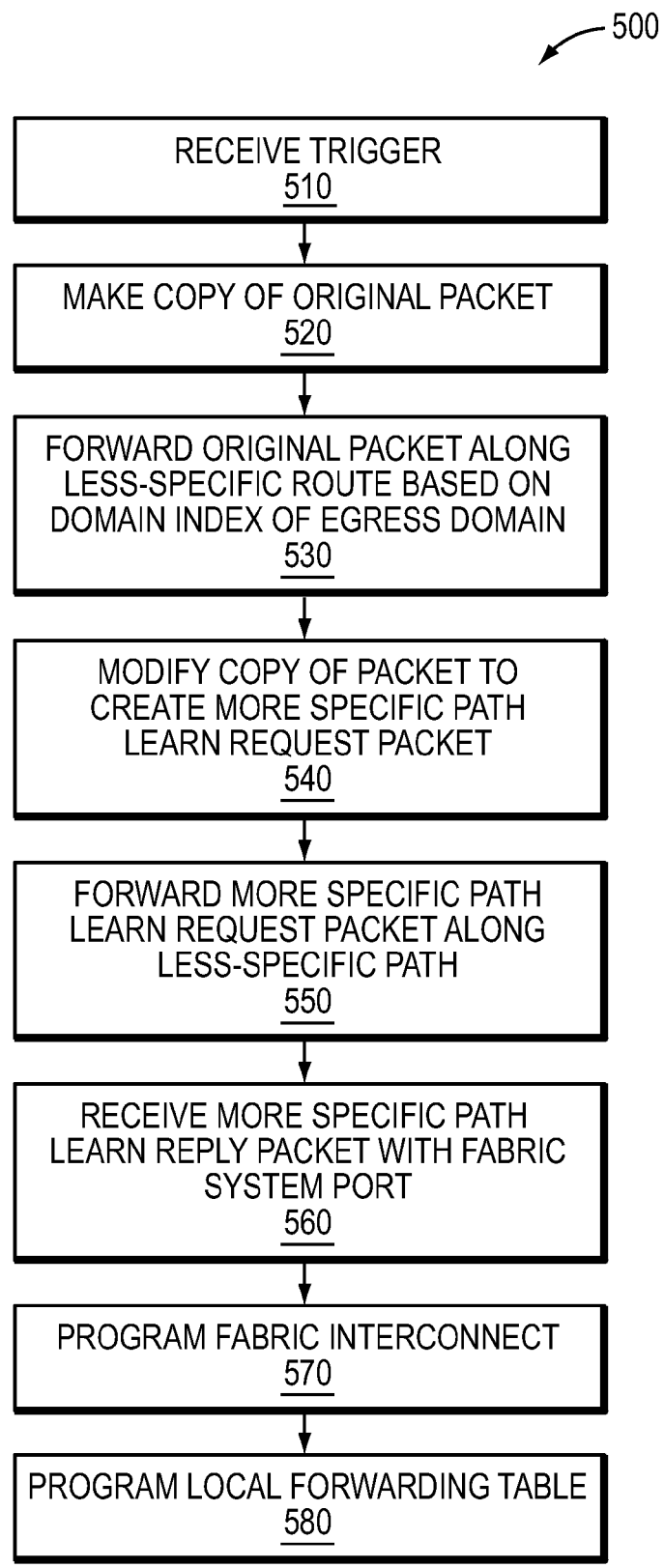
FIG. 5 is an example sequence of steps for transitioning from using a less-specific path to a more-specific path.

FIG. 5 is an example sequence of steps 500 transitioning from using a less-specific path (that is defined by a domain index and will pass traffic to any leaf switch (ToR) of the egress domain), to using a more-specific path (that is defined by a particular fabric system port coupled to the leaf switch (ToR) serving the egress end port). At step 510, a trigger is received. The trigger may be receipt of a packet for which a destination lookup points to a domain index, that is associated with a new source being learnt, which has an egress lookup pointing back to the fabric interconnect, or that satisfies other conditions. At step 520, a copy (e.g., a rate limited copy) is made of an original packet, such that there is an original packet and a copy of the packet. At step 530, the original packet is forwarded along the less-specific path, based on the domain index of the egress domain.

At step 540, the copy of the packet is modified by adding header fields associated with a special message type, to create a More Specific Path Learn Request packet. At step 550, the copy of the packet (now the More Specific Path Learn Request packet) is forwarded along the less-specific path. At step 560, a More Specific Path Learn reply packet is received back from the egress domain. Among other things, the More Specific Path Learn reply packet includes an indication of the fabric system port that serves the egress end port. At step 570, the ingress leaf switch (ToR) sends a message to the fabric interconnect 120 to program the fabric interconnect based on the indicated fabric system port. At step 580, the ingress leaf switch (ToR) programs a local forwarding table based on the indicated fabric system port. In this manner, subsequent packets may be directed along the more-specific path defined by the fabric system port. Further, port level QoS may be provided.

In summary, the present disclosure describes embodiments for transition from initially using a less-specific path (that is defined by a domain index and will pass traffic to any leaf switch (ToR) of the egress domain), to a more-specific path (that is defined by a particular fabric system port coupled serving an egress end port). At least some of the above-described embodiments may be implemented in software, in hardware, or a combination thereof. A software implementation may include computer-executable instructions stored in a non-transitory computer-readable medium, such as a volatile or persistent memory, a hard-disk, a compact disk (CD), or other tangible medium. A hardware implementation may include configured processors, logic circuits, application specific integrated circuits, and/or other types of hardware components. Further, a combined software/hardware implementation may include both computer-executable instructions stored in a non-transitory computer-readable medium, as well as one or more hardware components, for example, processors, memories, etc. The above descriptions are meant to be taken only by way of example. It is the object of the appended claims to cover all such variations and modifications as come within the true spirit and scope of the embodiments herein.

What is claimed is:

1. A method comprising:
creating a copy of an original packet of a traffic flow at an ingress leaf node of a cloud switch;
forwarding, by the ingress leaf node, the original packet along a less-specific path through the cloud switch, the less-specific path based on a domain index of an egress domain for the original packet;
modifying the copy of the original packet to create a more specific path learn request packet;
forwarding, by the ingress leaf node, the more specific path learn request packet along the less-specific path through the cloud switch;
receiving, at the ingress leaf node, a more specific path learn request reply packet that includes an indication of a fabric system port of a fabric interconnect; and
programming a forwarding table based on the indication of the fabric system port, to have subsequent packets of the traffic flow forwarded along a more-specific path defined by the fabric system port, wherein the programming the forwarding table further comprises: allocating on demand a local index from a pool of indexes; programming a local forwarding table entry of the ingress leaf node with the local index; and programming the local index in the fabric interconnect, wherein the local index is locally significant at the ingress leaf node and the fabric interconnect, and capable of being reused by other leaf nodes of the cloud switch.

2. The method of claim 1, wherein the domain index defines a portion of the cloud switch in which a non-globally unique index of an end port is unique.

3. The method of claim 1, further comprising:
returning the local index to the pool of indexes when the traffic flow ceases.

4. The method of claim 1, further comprising:
initially, using an aggregated entry in the forwarding table that indicates the domain index of the egress domain; and
wherein the programming creates an individual entry in the forwarding table to have the traffic flow forwarded along the more-specific path defined by the fabric system port.

5. The method of claim 4, further comprises
aging out the individual entry in the forwarding table when the traffic flow ceases.

6. The method of claim 1, wherein the forwarding the original packet along the less-specific path forwards the original packet to any leaf switch of the egress domain.

7. The method of claim 6, further comprising:
receiving the original packet at a first leaf switch of the egress domain that does not includes an egress end port for the traffic flow; and
forwarding the original packet from the first leaf switch to a second leaf switch of the egress domain that includes the egress end port.

8. The method of claim 1, wherein the fabric system port serves an egress end port of an egress leaf switch of the traffic flow.

9. The method of claim 1, wherein the more-specific path defined by the fabric system port passes the subsequent packets directly to a leaf switch of the egress domain that includes the egress end port.

10. The method of claim 1, wherein the creating the copy is performed in response to detecting a trigger.

11. The method of claim 10, wherein the trigger is receipt of a packet for which a destination lookup points to a domain index.

12. The method of claim 10, wherein the trigger is a host move.

13. An apparatus comprising:
one or more processors; and
one or more memories including instructions that, if executed by the apparatus, cause the apparatus to:
create a copy of an original packet of a traffic flow, forward the original packet along a less-specific path, the less-specific path based on a domain index of an egress domain for the original packet, modify the copy of the original packet to create a more specific path learn request packet, forward the more specific path learn request packet along the less-specific path, process a more specific path learn request reply packet that includes an indication of a fabric system port of a fabric interconnect, program a forwarding table based on the indication of the fabric system port, wherein the forwarding table is programmed by allocating on demand a local index from a pool of indexes; programming a local forwarding table entry of the apparatus with the local index; and programming the local index in the fabric interconnect, and cause subsequent packets of the traffic flow to be forwarded along a more-specific path defined by the fabric system port.

14. The apparatus of claim 13, wherein the domain index defines a portion of a cloud switch in which a non-globally unique index of an end port is unique.

15. The apparatus of claim 13, wherein the original packet is forwarded to any leaf switch of the egress domain.

16. The apparatus of claim 13, wherein the fabric system port serves an egress end port of an egress leaf switch of the traffic flow.

17. The apparatus of claim 13, wherein the more-specific path defined by the fabric system port passes the subsequent packets directly to a leaf switch of the egress domain that includes the egress end port.

18. The apparatus of claim 13, wherein the more specific path learn request packet includes a plurality of extension fields in a header, the plurality of extension fields including a type field, a subtype field, a forwarding type field, a local index field and a fabric system port field.

19. A non-transitory computer-readable medium having software encoded thereon, the software when executed operable to:

create a copy of an original packet of a traffic flow at an ingress leaf node of a cloud switch;

forward the original packet along a less-specific path through the cloud switch, the less-specific path based on a domain index of an egress domain for the original packet;

modify the copy of the original packet to create a more specific path learn request packet;

forward the more specific path learn request packet along the less-specific path through the cloud switch;

receive a more specific path learn request reply packet that includes an indication of a fabric system port of a fabric interconnect; and program a forwarding table based on the indication of the fabric system port, to have subsequent packets of the traffic flow forwarded along a more-specific path defined by the fabric system port, wherein the forwarding table is programmed by allocating on demand a local index from a pool of indexes; programming a local forwarding table entry of the ingress leaf node with the local index; and programming the local index in the fabric interconnect, wherein the local index is locally significant at the ingress leaf node and the fabric interconnect, and capable of being reused by other leaf nodes of the cloud switch.

20. The apparatus of claim 13, wherein the instructions that, upon being executed by the one or more processors, further causes the apparatus to:

return the local index to the pool of indexes when the traffic flow ceases.

* * * * *